United States Patent
Hamilton, II et al.

(10) Patent No.: US 6,944,790 B2
(45) Date of Patent: Sep. 13, 2005

(54) SYSTEM AND METHOD FOR COLLECTING AND RESTORING USER ENVIRONMENT DATA USING REMOVABLE STORAGE

(75) Inventors: Rick Allen Hamilton, II, Charlottesville, VA (US); Steven Jay Lipton, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 583 days.

(21) Appl. No.: 09/826,608

(22) Filed: Apr. 5, 2001

(65) Prior Publication Data

US 2002/0147938 A1 Oct. 10, 2002

(51) Int. Cl.⁷ .............................................. G06F 11/00
(52) U.S. Cl. ............................................ 714/6; 714/24
(58) Field of Search ................................ 714/6, 15, 24

(56) References Cited

U.S. PATENT DOCUMENTS

| | | | | |
|---|---|---|---|---|
| 3,969,723 | A | | 7/1976 | Kennicott ..................... 700/83 |
| 5,469,573 | A | * | 11/1995 | McGill et al. ................ 717/127 |
| 5,495,572 | A | | 2/1996 | Tanaka et al. ................ 714/47 |
| 5,692,121 | A | | 11/1997 | Bozso et al. ................. 713/13 |
| 5,712,971 | A | | 1/1998 | Stanfill et al. ............... 713/34 |
| 5,713,024 | A | * | 1/1998 | Halladay ...................... 717/168 |
| 5,794,252 | A | | 8/1998 | Bailey et al. ................ 707/202 |
| 5,924,102 | A | | 7/1999 | Perks .......................... 707/200 |
| 5,941,993 | A | | 8/1999 | Tanaka et al. ................ 714/6 |
| 6,119,128 | A | | 9/2000 | Courter et al. ............... 707/202 |
| 6,141,771 | A | | 10/2000 | O'Brien et al. .............. 714/15 |
| 6,167,494 | A | | 12/2000 | Cheston et al. .............. 711/162 |
| 6,205,527 | B1 | * | 3/2001 | Goshey et al. ................ 711/162 |
| 6,260,124 | B1 | * | 7/2001 | Crockett et al. .............. 711/162 |
| 6,289,426 | B1 | * | 9/2001 | Maffezzoni et al. .......... 711/173 |
| 6,449,682 | B1 | * | 9/2002 | Toorians ...................... 711/100 |
| 6,453,396 | B1 | * | 9/2002 | Boone et al. ................. 711/162 |
| 6,487,558 | B1 | * | 11/2002 | Hitchcock .................... 707/200 |
| 6,532,535 | B1 | * | 3/2003 | Maffezzoni et al. ........... 713/1 |
| 6,594,780 | B1 | * | 7/2003 | Shen et al. ................... 714/15 |
| 2001/0013102 | A1 | * | 8/2001 | Tsuchiya et al. .............. 714/6 |
| 2002/0135613 | A1 | * | 9/2002 | O'Hara ........................ 345/745 |
| 2002/0147938 | A1 | * | 10/2002 | Hamilton et al. ............... 714/6 |

FOREIGN PATENT DOCUMENTS

| | | | | |
|---|---|---|---|---|
| JP | 07-007770 A | 1/1995 | ............ H04Q/9/00 |
| JP | 11-085628 A | 3/1999 | ............ G06F/12/16 |

OTHER PUBLICATIONS

Polyzois, et al., "Evaluation of Remote Backup Algorithms for Transaction Processing System," ACM Transactions on Database Systems, vol. 19, #3, p. 423–429, Sep. 1994, (Abstract Only).

* cited by examiner

*Primary Examiner*—Bryce P. Bonzo
(74) *Attorney, Agent, or Firm*—Van Leeuwen & Van Leeuwen; Joseph T. Van Leeuwen; David A. Mims, Jr.

(57) ABSTRACT

A data collection program collects data from a user's workstation and captures the user environment data, including user settings and program application data. The user environment data is stored on a removable nonvolatile storage media for duplication processing. The stored user environment data is processed by a duplication process to duplicate the user environment data from the old workstation onto a new workstation or for recovery from a catastrophic system failure. A variety of user environment settings, not traditionally captured and restored by traditional backup software, are captured and restored. For example, licensing information and application personality data is identified, stored, and recovered along with other user-specific information such as hostnames, IP addresses, and the like.

11 Claims, 11 Drawing Sheets

SYSTEM AND METHOD FOR COLLECTING AND RESTORING USER ENVIRONMENT DATA USING REMOVABLE STORAGE

RELATED APPLICATIONS

This application is related to the following co-pending U.S. patent applications filed on Mar. 31, 2000 and having the same inventors and assignee: "System and Method for Event-Based Computer System Duplication" (application Ser. No. 09/540,914, filed Mar. 31, 2000), "System and Method for Computer System Duplication" (application Ser. No. 09/540,344, filed Mar. 31, 2000), and "Method and System for Implementing Network Filesystem-Based Customized Computer System Automated Rebuild Tool" (application Ser. No. 09/422,361, filed Oct. 21, 1999) each by Hamilton and Lipton and each assigned to the IBM Corporation.

BACKGROUND

1. Field of the Invention

The present invention relates to information processing technology. More particularly, the present invention relates to a system and method for simplifying the restoration and recovery of user environment data in a computer system.

2. Description of the Related Art

The UNIX operating system is an interactive time-sharing operating system invented in 1969. The UNIX operating system is a multi-user operating system supporting serial and network connected terminals for multiple users. UNIX is a multitasking operating system allowing multiple users to use the same system simultaneously. The UNIX operating system includes a kernel, shell, and utilities. UNIX is a portable operating system, requiring only the kernel to be written in assembler, and supports a wide range of support tools including development, debuggers, and compilers.

As a multi-user operating system, UNIX allows multiple people to share the same computer system simultaneously. UNIX accomplishes this by time-slicing the computer's central processing unit, or "CPU," into intervals. Each user gets a certain amount of time for the system to execute requested instructions. After the user's allotted time has expired, the operating system intervenes by interrupting the CPU, saving the user's program state (program code and data), restores the next user's program state and begins executing the next user's program (for the next user's amount of time). This process continues indefinitely cycling through all users using the system. When the last user's time-slice has expired, control is transferred back to the first user again and another cycle commences.

The UNIX operating system is both a multi-user operating system and a multi-tasking operating system. As the name implies, the multi-user aspect of UNIX allows multiple users to use the same system at the same time. As a multi-tasking operating system, UNIX permits multiple programs (or portions of programs called threads of execution) to execute at the same time. The operating system rapidly switches the processor between the various programs (or threads of execution) in order to execute each of the programs or threads. IBM's OS/2 and Microsoft's Windows 95/98/NT are examples of single-user multi-tasking operating systems while UNIX is an example of a multi-user multi-tasking operating system. Multi-tasking operating systems support both foreground and background tasks. A foreground task is a task that directly interfaces with the user using an input device and the screen. A background task runs in the background and does not access the input device(s) (such as the keyboard, a mouse, or a touch-pad) and does not access the screen. Background tasks include operations like printing which can be spooled for later execution.

The UNIX operating system keeps track of all programs running in the system and allocates resources, such as disks, memory, and printer queues, as required. UNIX allocates resources so that, ideally, each program receives a fair share of resources to execute properly. UNIX doles out resources using two methods: scheduling priority and system semaphores. Each program is assigned a priority level. Higher priority tasks (like reading and writing to the disk) are performed more regularly. User programs may have their priority adjusted dynamically, upwards or downwards, depending on their activity and the available system resources. System semaphores are used by the operating system to control system resources. A program can be assigned a resource by getting a semaphore by making a system call to the operating system. When the resource is no longer needed, the semaphore is returned to the operating system, which can then allocate it to another program.

Disk drives and printers are serial in nature. This means that only one request can be performed at any one time. In order for more than one user to use these resources at once, the operating system manages them using queues. Each serial device is associated with a queue. When a programs wants access to the device (i.e., a disk drive) it sends a request to the queue associated with the device. The UNIX operating system runs background tasks (called daemons), which monitor the queues and service requests for them. The requests are performed by the daemon process and the results are returned to the user's program.

Multi-tasking systems provide a set of utilities for managing processes. In UNIX, these are ps (list processes), kill (kill a process), and & at the end of a command line (run a process in the background). In UNIX, all user programs and application software use the system call interface to access system resources such as disks, printers, and memory. The system call interface in UNIX provides a set of system calls (C language functions). The purpose of the system call interface is to provide system integrity, as all low-level hardware access is under the control of the UNIX operating system and not the user-written programs. This prevents a program from corrupting the system.

Upon receiving a system call, the operating system validates its access permission, executes the request on behalf of the requesting program, and returns the results to the requesting program. If the request is invalid or the user does not have access permission, the operating system does not perform the request and an error is returned to the requesting program. The system call is accessible as a set of C language functions, as the majority of UNIX is written in the C language. Typical system calls are: _read—for reading from the disk; _write—for writing to the disk; _getch—for reading a character from a terminal; _putch—for writing a character to the terminal; and _ioctl—for controlling and setting device parameters.

The Kernel

As the name implies, the kernel is at the core of the UNIX operating system and is loaded each time the system is started, also referred to as a system "boot." The kernel manages the resources of the system, presenting them to the users as a coherent system. The user does not have to understand much, if anything, about the kernel in order to use a UNIX system. The kernel provides various necessary functions in the UNIX environment. The kernel manages the system's memory and allocates it to each process. It takes time for the kernel to save and restore the program's state and switch from one program to the next (called dispatching). This action needs to execute quickly because time spent switching between programs takes away from the time available to actually run the users' programs. The time spent in the "system state" where the kernel performs tasks like switching between user programs is the system overhead and should be kept as low as possible. In a typical UNIX system, system overhead should be less than 10% of the overall time.

The kernel also schedules the work to be done by the central processing unit, or "CPU," so that the work of each user is carried out efficiently. The kernel transfers data from one part of the system to another. Switching between user programs in main memory is also done by the kernel. Main system memory is divided into portions for the operating system and user programs. Kernel memory space is kept separate from user programs. When insufficient main memory exists to run a program, another program is written out to disk (swapped) to free enough main memory to run the first program. The kernel determines which program is the best candidate to swap out to disk based on various factors. When too many programs are being executed on the system at the same time, the system gets overloaded and the operating system spends more time swapping files out to disk and less time executing programs causing performance degradation. The kernel also accepts instructions from the "shell" and carries them out. Furthermore, the kernel enforces access permissions that are in place in the system. Access permissions exist for each file and directory in the system and determine whether other users can access, execute, or modify the given file or directory.

Files and Directories

For file handling, UNIX uses a hierarchical directory structure for organizing and maintaining files. Access permissions correspond to files and directories. As previously stated, the UNIX operating system organizes files into directories which are stored in a hierarchical tree-type configuration. At the top of the tree is the root directory which is represented by a slash (/} character. The root directory contains one or more directories. These directories, in turn, may contain further directories containing user files and other system files. A few standard directories that will be found in many UNIX are as follows:

/bin This directory contains the basic system commands.

/etc This directory contains system configuration files and programs used for administrating the system.

/lib This directory contains the system libraries.

/tmp This directory is used to store temporary files.

/usr/bin This directory contains the commands that are not stored in /bin.

/usr/man This directory contains manual pages for programs

/usr/local This directory contains local programs that were installed by the system administrator (sysadmin) and were not included with the original system. In particular, /usr/local/bin contains local command files (binaries), and /usr/local/man contains local manual pages.

/home The actual directory location varies from system to system, but somewhere on the system will be a location where all of the users' home directories are located.

The fundamental structure that the UNIX operating system uses to store information is the file. A file is a sequence of bytes. UNIX keeps track of files internally by assigning each file a unique identification number. These numbers, called i-node numbers, are used only within the UNIX kernel itself. While UNIX uses i-node numbers to refer to files, it allows users to identify each file by a user-assigned name. A file name can be any sequence of characters and can be up to fourteen characters long.

There are three types of files in the UNIX file system: (1) ordinary files, which may be executable programs, text, or other types of data used as input or produced as output from some operation; (2) directory files, which contain lists of files in directories outlined above; and (3) special files, which provide a standard method of accessing input/output devices.

Internally, a directory is a file that contains the names of ordinary files and other directories and the corresponding i-node numbers for the files. With the i-node number, UNIX can examine other internal tables to determine where the file is stored and make it accessible to the user. UNIX directories themselves have names, examples of which were provided above, and can be up to fourteen characters long.

UNIX maintains a great deal of information about the files that it manages. For each file, the file system keeps track of the file's size, location, ownership, security, type, creation time, modification time, and access time. All of this information is maintained automatically by the file system as the files are created and used. UNIX file systems reside on mass storage devices such as disk drives and disk arrays. UNIX organizes a disk into a sequence of blocks. These blocks are usually either 512 or 2048 bytes long. The contents of a file are stored in one or more blocks which may be widely scattered on the disk.

An ordinary file is addressed through the i-node structure. Each i-node is addressed by an index contained in an i-list. The i-list is generated based on the size of the file system, with larger file systems generally implying more files and, thus, larger i-lists. Each i-node contains thirteen 4-byte disk address elements. The direct i-node can contain up to ten block addresses. If the file is larger than this, then the eleventh address points to the first level indirect block. Addresses 12 and 13 are used for second level and third level indirect blocks, respectively, with the indirect addressing chain before the first data block growing by one level as each new address slot in the direct i-node is required.

All input and output (I/O) is done by reading and writing files, because all peripheral devices, even terminals, are treated as files in the file system. In a most general case, before reading and writing a file, it is necessary to inform the system of the intention to do so by opening the file. In order to write to a file, it may also be necessary to create it. When a file is opened or created (by way of the "open" or "create" system calls), the system checks for the right to do so and, if the user has the right to do so, the system returns a non-negative integer called a file descriptor. Whenever I/O is to be done on this file, the file descriptor is used, instead of the file name, to identify the file. The open file descriptor has associated with it a file table entry kept in the "process" space of the user who has opened the file. In UNIX terminology, the term "process" is used interchangeably with a program that is being executed. The file table entry contains information about an open file, including an i-node pointer for the file and the file pointer for the file, which defines the current position to be read or written in the file. All information about an open file is maintained by the system.

In conventional UNIX systems, all input and output is done by two system calls—"read" and "write"—which are accessed from programs having functions of the same name. For both system calls, the first argument is a file descriptor, the second argument is a pointer to a buffer that serves as the data source or destination, and the third argument is the number of bytes to be transferred. Each "read" or "write" system call counts the number of bytes transferred. On reading, the number of bytes returned may be less than the number requested because fewer bytes than the number requested remain to be read. A return code of zero means that the end-of-file has been reached, a return code of −1 means that an error occurred. For writing, the return code is the number of bytes actually written. An error has occurred if this number does not match the number of bytes which were supposed to be written.

Shells

UNIX monitors the state of each terminal input line connected to the system with a system process called getty. When getty detects that a user has turned on a terminal, it presents the logon prompt, and when the userid and password are validated, the UNIX system associates a shell program (such as sh) with that terminal placing the user in the shell program. The shell program provides a prompt that typically signifies which shell program is being executed. The user types commands at the prompt. The shell program acts as a command interpreter taking each command and passing them to the kernel to be acted upon. The shell then displays the results of the operation on the screen. Users use the shell to create a personalized environment that suits the needs of the user. The user can change environment variables that control the user's environment.

The EDITOR environment variable sets the editor that will be used by other programs such as the mail program. The PAGER environment variable sets the pager that will be used by programs such as man to display manual pages. The PATH environment variable specifies the directories that the shell is to look through to find a command. These directories are searched in the order in which they appear. The PRINTER environment variable sets the printer to which all output is sent by the lpr command. The SHELL variable sets the default shell that is used by the user. The TERM variable sets the terminal type for programs such as the editor and pager. The TZ environment variable sets the time zone where the user is located.

There are several shells that are available to UNIX users. Each shell provides different features and functionality than other shells. The most common UNIX shell programs are the "Bourne" shell, the "C" shell, the "TC" shell, the "Korn" shell, and the "BASH" shell. As well as using the shell to run commands, each of these shell programs have a built-in programming language that a user can use to write their own commands or programs. A user can put commands into a file known as a shell script—and execute the file like a command or program. Shells invoke two types of commands: internal commands (such as set and unset) which are handled by the shell program and external commands (such as ls, grep, sort, and ps) which are invoked as programs.

Challenges With Duplicating Systems in the Prior Art

One advantage of the UNIX operating system is that users can customize their working environment to suit their needs. For example, users can choose a default editor, a pager to display manual pages, a path to specify directories that are searched for commands, a default printer, a terminal type for use by the editor and the pager, a time-zone for displaying the correct time, and the shell program that is associated with the user's terminal upon logging on to the system.

One challenge in today's complex computing environment is moving a user from one system to another due to system changes or user relocation from one system to another system. Because of computer complexity and the amount of customizing a user may make to his or her environment, duplicating a user's computing environment has become even more challenging. Recreating UNIX images, in particular, requires that numerous system parameters, including printer definitions, tty definitions (terminal definitions or the name of a particular terminal controlling a given job or even serial port definitions—in UNIX such devices have names of the form tty*), network interfaces, user Ids, and passwords. Failure to duplicate all such parameters may result in the inability of the user to run key applications or access critical resources following such a system duplication. Challenges in present duplication schemes wherein the duplication is largely a manual effort include time consuming manual tasks performed by the user and/or system administrator and the fact that such manual tasks are prone to errors.

SUMMARY

It has been discovered that user environment data can be duplicated from a workstation to another workstation in a semi-automated fashion. Initially, an automated data collection process collects user environment data from the old computer system. User environment data may include application program data, license information, tty settings, customized directories, and other user customized workstation environment variables.

A list of workstations can also be used to duplicate a number of workstations, for example when a group of individuals are upgrading their workstations. The user environment data is stored for later duplication onto a new workstation. The user environment data is stored onto a removable computer operable medium, such as a diskette or a magnetic tape, for transporting and inputting into the new workstation or for use in restoring the old computer when a system failure occurs. Duplicating the user environment settings on a new workstation involves reading the user environment data stored on the computer operable medium and applying the user environment settings to the workstation.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
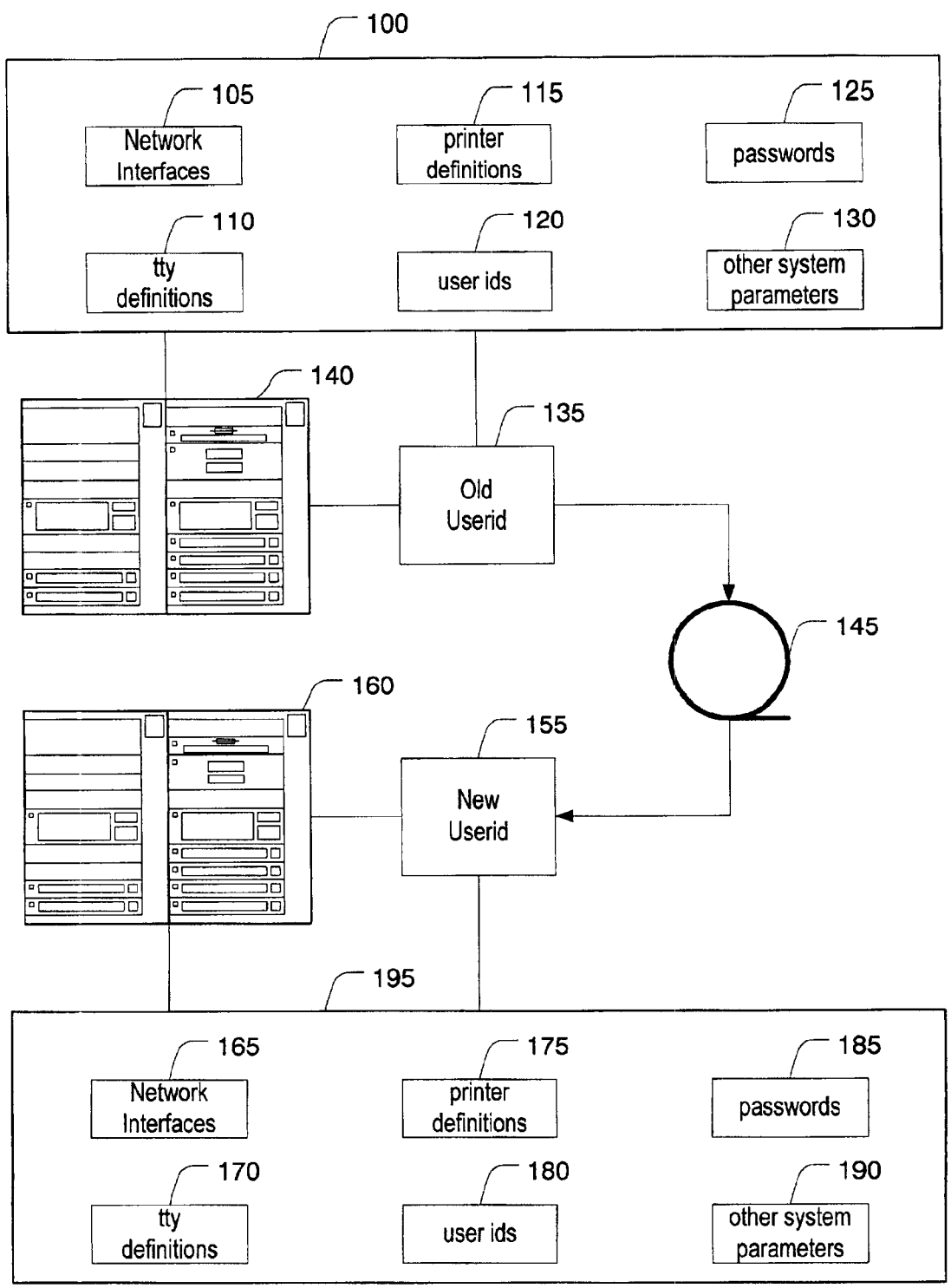
FIG. 1 is a system diagram showing user environment data being duplicated through a computer operable medium.

FIG. 1 is a system diagram illustrating user environment data being copied and sent from one computer system to another computer system. The user's old user environment data 100 includes network interfaces 105, tty definitions 110, printer definitions 115, userids 120, passwords 125, and other system parameters 130, such as application specific information. In essence, old user environment data 100 includes the customizations and modifications made to the user's account as a result of the user's preferences or made so the user could better perform his or her job related tasks. In this example, the user is moving from old userid 135 in old computer system 140 to new userid 155 connected to new computer system 160. Once old user environment data 100 is gathered from old computer system 140, they are transferred to new computer system 160 using nonvolatile computer media 145. Nonvolatile computer media 145 may be may be a diskette, magnetic tape, ZIP disk, JAZ disk, CD-R (recordable CD-ROM), hard drive, optical disk, or any medium that can transfer data by being transported from one computer system to another.

After old user environment data 100 has been received at new computer system 160, a process is invoked that duplicates old user environment data 100 onto new computer system 160 creating new user environment data 195. Similarly to old user environment data 100, new user environment data 195 includes network interfaces 165, tty definitions 170, printer definitions 175, userids 180, passwords 185, and other system parameters 190, such as application specific information. After old user environment data 100 has been duplicated onto new computer system 160, the customization settings are ultimately the same as the settings the user was accustomed to using on old computer system 140.

In addition to moving from one system to another system, environment data 100 may be captured in response to various events that occur in the system. For example, on a given schedule, the user's environment data may be captured and stored on old computer system 140 or new computer system 160. In this manner, the environment data 100 is periodically captured so that if a system failure occurs on old computer system 140, new userid 155 can quickly be created and the environment data restored creating new environment data 195 and the user can have a substantially similar system in operation in a minimum amount of time. Other events, or triggers, may be to capture environment data 100 each time environment data 100 is modified by the user. In this manner, the old environment data 100 would have an up to date copy. It may also be advantageous to keep multiple copies of old environment data 100 after subsequent capture operations have taken place. By keeping multiple copies of old environment data 100, the user can quickly regress to a former set of environment data should newly applied updates to the environment data prove to be undesirable by the user. Another event, or trigger, may be a command from a centralized operations area that periodically captures several users' environment data without need of such users' intervention. In this way, systems management personnel can have confidence in restoring user environment data should a system failure occur for one or more of the users they support.

Figure 2:
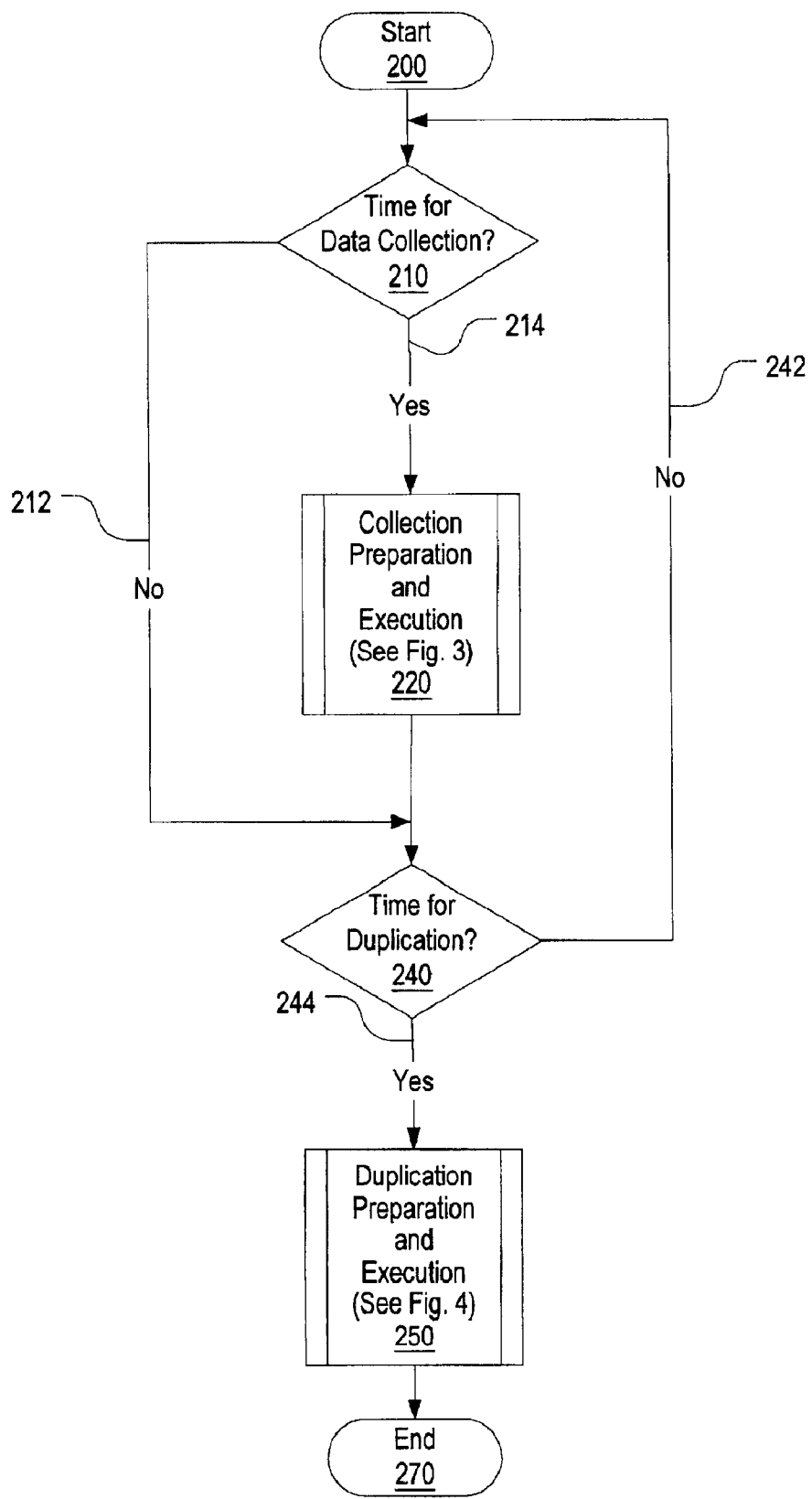
FIG. 2 is a high-level flowchart showing of one embodiment of the present invention.

FIG. 2 shows a high-level flowchart for collecting data and duplicating data. The process is commenced at start 200 whereupon a decision is made to determine whether it is time for data collection at decision 210. Decision 210 can be based upon various factors. For example, data collection could be scheduled to repeat at various time intervals to backup the customization data. Another trigger for decision 210 could a monitor that sets a flag or indicator any time user environment data is changed. If the flag is set, the data collection process is invoked. In addition, decision 210 could be a manual decision that is only made when the user is moving from one system to another. Decision 210 could also be made by systems management personnel that decide when to collect data for a number of users. If decision 210 is false (i.e., not time for data collection), "no" branch 212 is taken. If decision 210 is true (i.e., time for data collection), "yes" branch 214 is taken to execute collection process 220 (see FIG. 3 for a detailed flowchart of the data collection process). Data collection is performed with the intention of duplicating personality information on a new workstation. In particular, and as described in further detail in FIG. 3, data collection includes an awareness of many system parameters, including printer definitions, tty definitions, network interfaces, user Ids, and passwords. The system parameter values define a system's "personality." Personality information can be thought of as any user and/or group selectable parameters, settings, and/or options used for customizing either a computer system, software, or firmware attributes. Personality parameters might be as uncomplicated as menu color schemes or as complex as the specification of preferred algorithms needed for processing information with a particular application program. Following either processing of collection process 220 or "no" branch 212, a second decision is made as to whether it is time for duplication processing at decision 240. If decision 240 is false (i.e., not time for duplication processing), "no" branch 242 is taken looping back to start 200 and decision 210. On the other hand, if decision 240 is true (i.e., time for duplication processing), "yes" branch 244 is taken to execute duplication process 250 (see FIG. 4 for details about duplication process 250). Following duplication process 250, processing terminates at termination 270.

Figure 3:
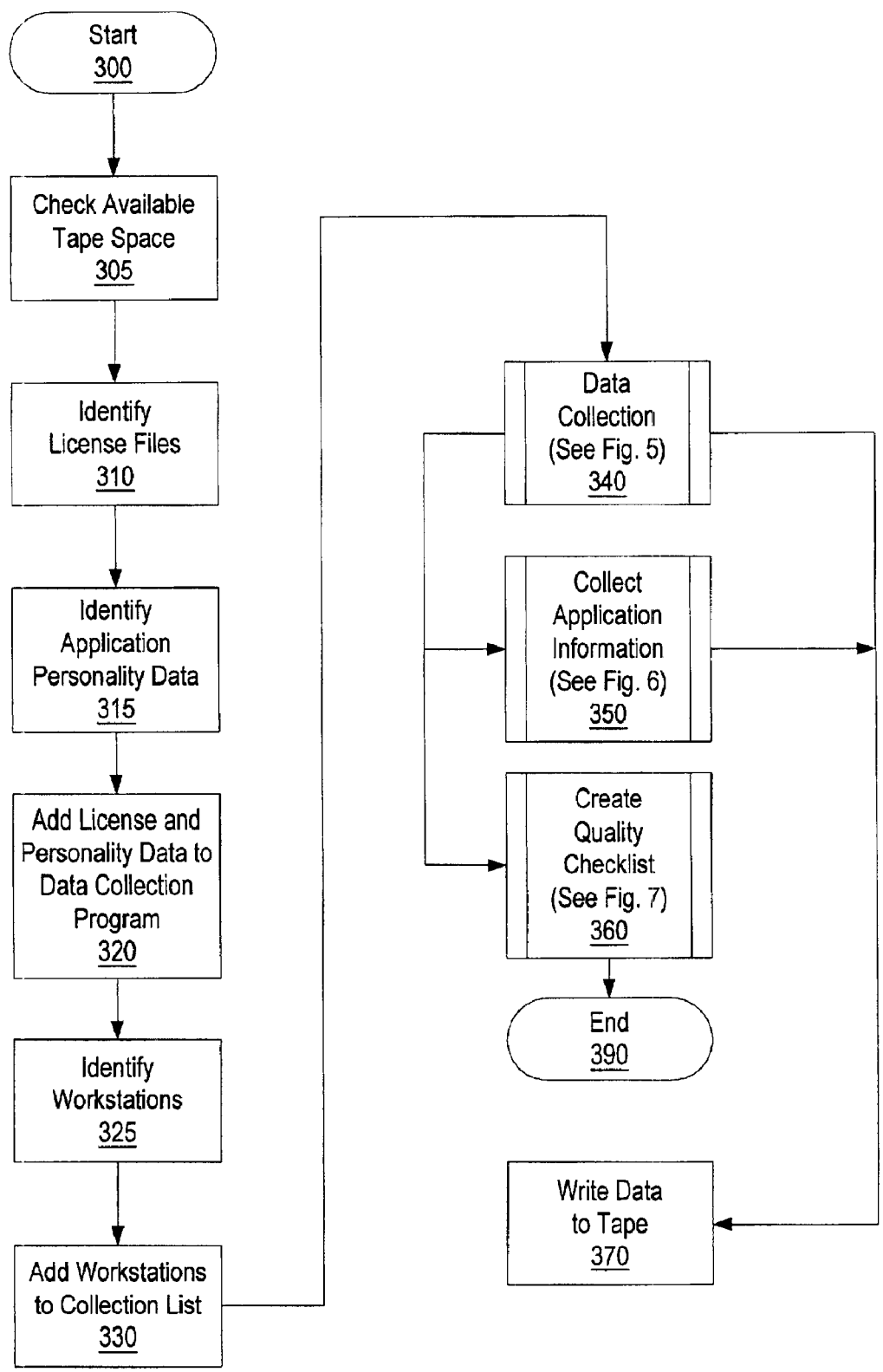
FIG. 3 is a mid-level flowchart showing the collection phase.

FIG. 3 shows a mid-level flowchart containing details of collection process 220 shown in FIG. 2. The process is commenced at start 300 whereupon the nonvolatile media is checked (step 305) to determine whether there is sufficient space to hold the data collected by collection process 220 shown in FIG. 2. If insufficient room exists on the nonvolatile media, an error message is displayed and processing is terminated. If sufficient room exists on the nonvolatile media, license files are identified (step 310) to identify license file information that needs to be collected. In one embodiment, identifying license files is a manual process whereby the user modifies script files to identify the license files. The term "script file" as used herein refers to shell script files used with shells programs within the UNIX operating system, examples of which are included in the appendices. The functionality of such script files could be implemented in other programmatic fashions, such as interpreted languages such as REXX and BASIC, as well as compiled languages, such as C and Pascal (with data files used to identify license files and the like rather than recompiling the program files). Consequently, the term "script" is used herein to represent any programming language that could be used to implement the functionality of the present invention.

The script files will later be executed by the computer system to perform data collection processing. After identifying license files (step 310) completes, application personality data is identified (step 315) to identify applications installed and also identify customized settings corresponding to such applications. Again, in one embodiment such identification is done manually and script files are modified respective to the application personality data for subsequent execution by the computer system. Next, license and personality data are added to the data collection program (step 320) to identify the information to be collected to the data collection script. One embodiment of the present invention allows for data collection and duplication to be performed for multiple workstations. In identifying workstations (step 325), the workstations that will have data collected are identified by address. These addresses are then included in a collection list (step 330). The data collection scripts that will be invoked subsequently read the workstation collection list and perform data collection for each workstation identified in the list.

For each workstation listed in the collection list, data collection process (predefined process 340, see FIG. 5 for further details), collect application information process (predefined process 350, see FIG. 6 for further details), and create quality checklist process (predefined process 360, see FIG. 7 for further details) are performed and the data is written to the nonvolatile storage media (step 370). After the data is written to the nonvolatile storage media, data collection processing ends at 390).

Figure 4:
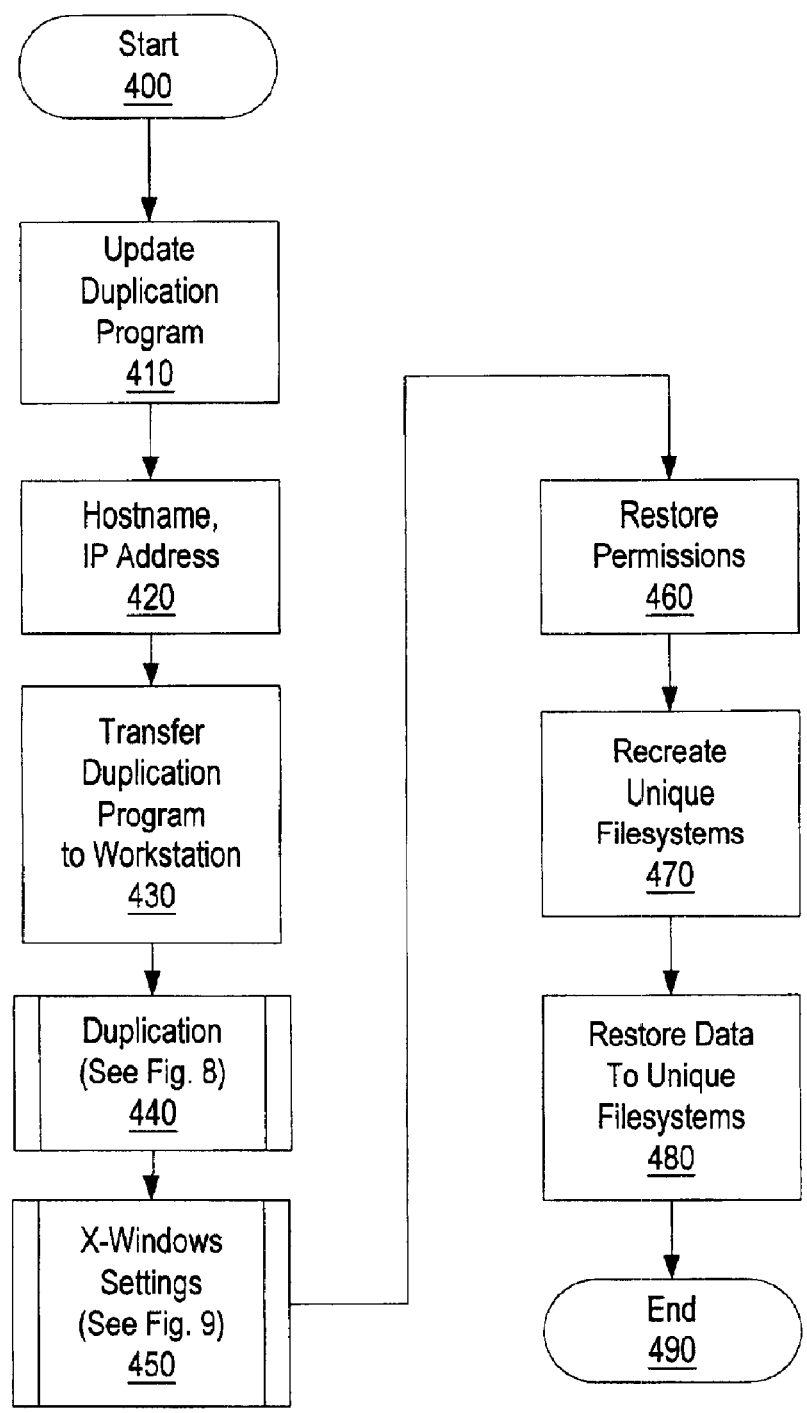
FIG. 4 is a mid-level flowchart showing the duplication phase.
Figure 8:
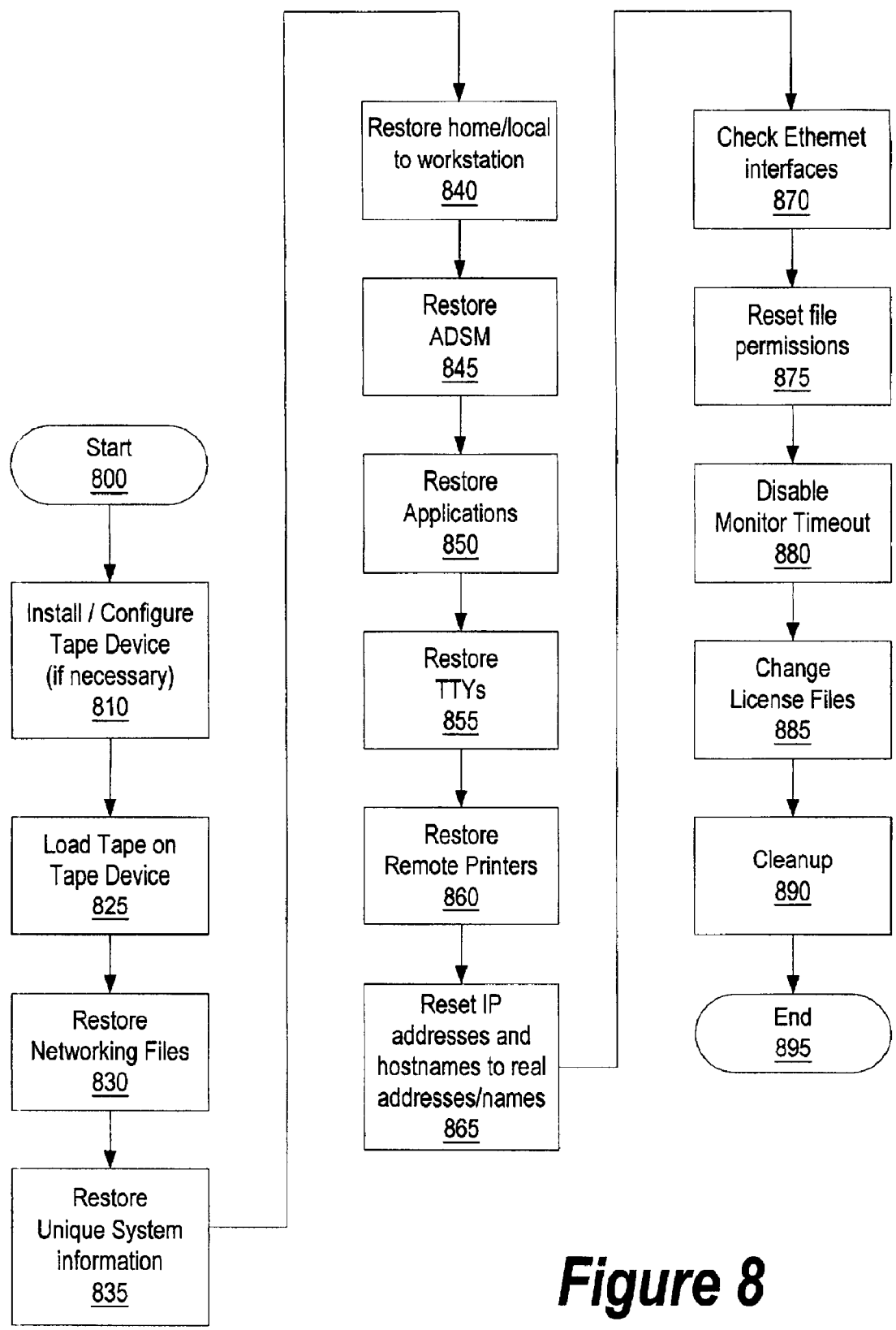
FIG. 8 is a low-level flowchart showing duplication steps.
Figure 9:
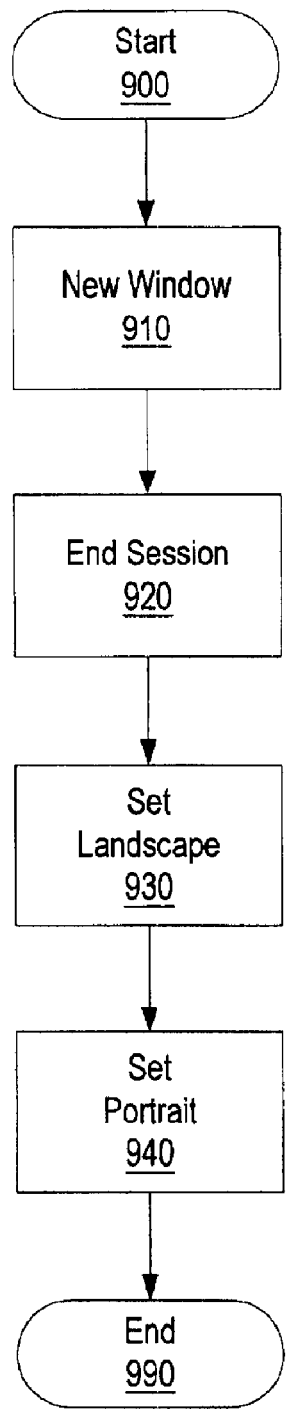
FIG. 9 is a lower-level flowchart showing display settings duplication.

FIG. 4 is a mid-level flowchart of the processing performed by duplication preparation and execution process 250 shown in FIG. 2. The process is commenced at start 400 whereupon duplication program is updated (step 410). Update duplication program (step 410) uses the information that was written to the nonvolatile storage media (see FIG. 3, step 370) to update the duplication script that will be executed on the workstation. Next, during hostname IP address process (step 420) a permanent hostname and IP address is provided for the user's new workstation. The duplication program is then transferred to the workstation (step 430) where it will be executed from a root user session on the new workstation. The duplication program (predefined process 440) is then executed to duplicate the settings previously collected from the old workstation onto the new workstation. Details of the duplication (predefined process 440) processing are shown in FIG. 8. The duplication program subsequently calls the X-Windows settings program (predefined process 450) so that customization of X-Windows (in a UNIX environment) can occur. Details of the X-Windows settings program (predefined process 450) are shown in FIG. 9. Next, file permissions are restored (step 460) using a custom permission list (perm.list). After file permissions are restored, unique filesystems are created (step 470) from the information previously collected from the old workstation. After the unique filesystems are created, data previously collected from the unique filesystems is restored (step 480) to the filesystems created during step 470. After the data has been restored, the duplication process ends at termination step 490.

Upon completion, a user's duplicated workstation includes personality information matching the information that was present in the user's previous workstation. The user is thus freed from the tedious tasks associated with re-customizing the new workstation. The mundane tasks of gathering personality information and using that data for customizing a group of workstations is automated and may be performed from a centralized location. The system administrator, on the other hand, is freed from the responsibility of manually reconfiguring a user's new workstation following the user's move from one workstation to another. By providing the means, both to capture data about workstations and duplicate it on physically separate media, the present invention ensures a smoother transition from one workstation to the next and reduces the amount of downtime a user experiences in configuring a new workstation. The present invention provides additional benefits to UNIX-based operation. Although developed on IBM's AIX operating system, the principles here are easily extendable to other UNIX environments, such as LINUS, Solaris, and others. The principles here are also extendable to non-UNIX-based operating systems, such as other multi-user operating systems and other multitasking operating systems (such as IBM's OS/2 and Microsoft's Windows 95/98/NT). The concept of duplicating user environment settings across a wide number of computer systems is both new and unique and will benefit anyone with customized user settings that needs to migrate from one workstation to another.

Figure 5:
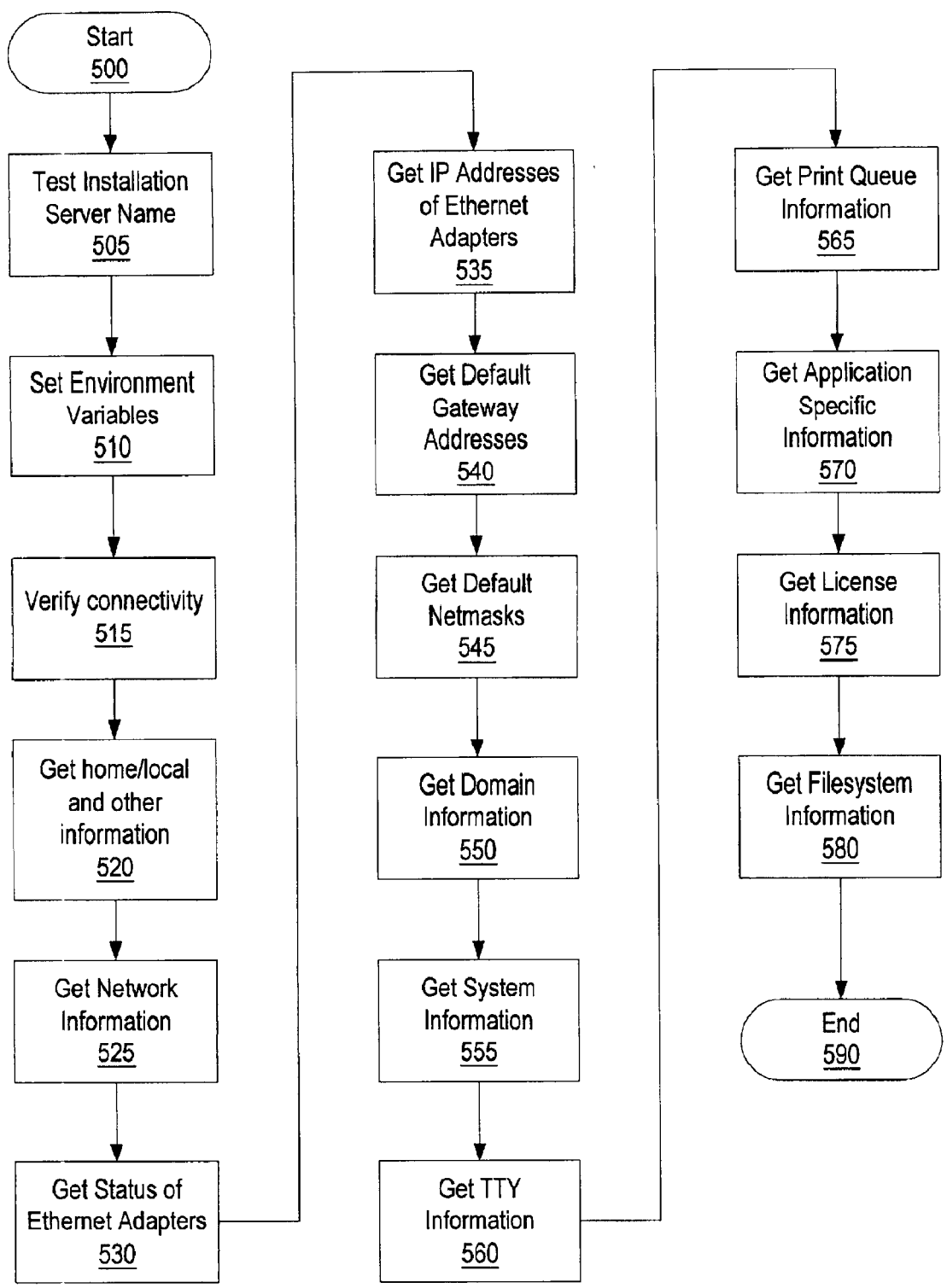
FIG. 5 is a lower-level flowchart showing the data collection steps.

FIG. 5 shows a low-level flowchart for the data collection process (predefined process 340, shown in FIG. 3). Data collection processing commences at step 500. First, a test is made to determine the location of the nonvolatile media device, such as a tape or disk drive, used to store the data (step 505). Next, environment variables are set (step 510) in preparation for further processing. After environment variables have been set, the connectivity between the client workstation and the nonvolatile storage device is verified and a working list of hostnames is created (step 515). After connectivity has been verified, information is retrieved from the workstations/home/local directory and other workstation specific information is gathered (step 520). Next, network information is retrieved (step 525) which includes retrieving key network configuration files, getting the status of the workstations' Ethernet adapters (step 530), getting the IP addresses corresponding to the Ethernet adapters (step 535), getting the default gateway addresses to the network (step 540), getting the default netmasks (step 545), and getting the domain information (step 550) which includes the domain name and name server addresses. After the network information is retrieved, system information is retrieved (step 555). Then tty information is retrieved from the old workstation (step 560). After tty information has been retrieved, print queue information is retrieved (step 565). Next, application specific data (previously identified in step 315 shown in FIG. 3) is retrieved (step 570). After application specific data has been retrieved, license information (previously identified in predefined process 310 shown in FIG. 3) is retrieved. Finally, filesystem information is retrieved (step 580). The information retrieved during the collection process shown in FIG. 5 is stored in a removable nonvolatile computer operable media, such as a diskette, tape, or CD-R.

Figure 6:
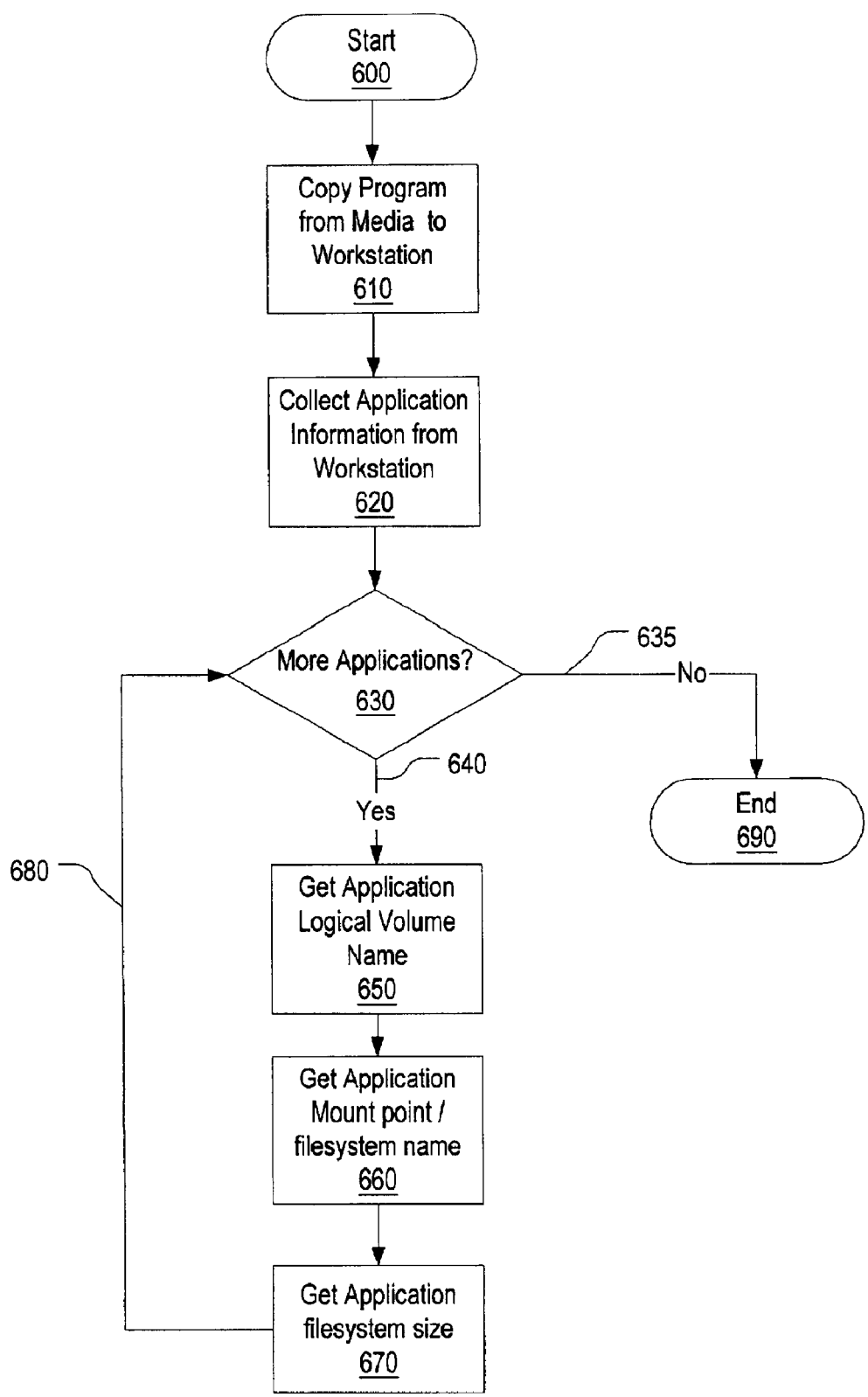
FIG. 6 is a lower-level flowchart showing the application information collection.

FIG. 6 is a low-level flowchart showing the detail involved in collecting application information (see predefined process 350 in FIG. 3). After commencing the process (step 600), the program is copied from the removable nonvolatile storage device to the individual workstation (step 610). Application information is then collected from the workstation (step 620). A loop construct is entered to collect the application information for each of the applications identified. If no more applications exist for which data is to be retrieved (decision 630), "no" branch 635 is executed and processing is terminated at 690. On the other hand, if more applications exist, "yes" branch 640 is executed to get the application information.

First, the application logical volume name is retrieved (step 650). Next, the application mount point and filesystem name are retrieved (step 660). Finally, the application filesystem size is retrieved (step 670) before processing loops back (loop 680) to check if more applications have data to be retrieved at step 630. This loop continues until no more applications need to be retrieved, at which point "no" branch 635 is executed and processing is terminated at 690.

Figure 7:
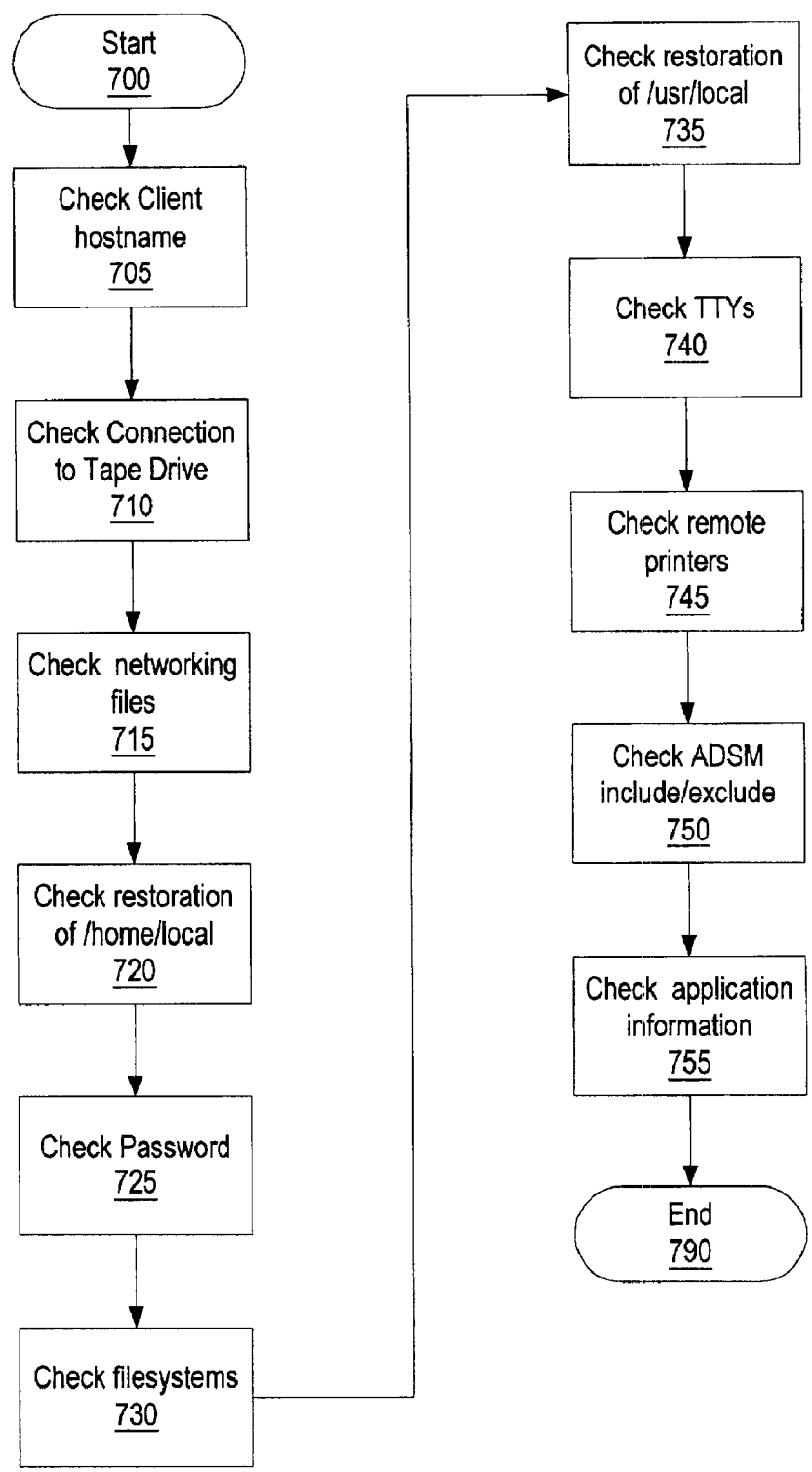
FIG. 7 is a lower-level flowchart showing the creation of a quality checklist.

FIG. 7 shows a low-level flowchart detailing the creation of a quality checklist (see predefined process 360 on FIG. 3). Processing commences (step 700) whereupon a check is made to make sure a client hostname has been retrieved (step 705). Next, a check is made to ensure that a connection has been made between the workstation and the removable nonvolatile storage device (step 710). Networking files are then checked (step 715) to make sure they are correct. After networking files are checked, the restoration of the /home/local directory is checked (step 720). Next, passwords are checked to make sure they have been collected properly (step 725). After the passwords have been checked, the filesystems are checked (step 730). Next, the restoration of the /usr/local directory is checked (step 735). After the directory is checked, the ttys are checked and verified (step 740). Next, ADSM (IBM's ADSTAR Distributed Storage Manager) is checked for any included/excluded files (step 745). The application information that was previously identified and collected is then checked (step 750). Finally, the Ethernet and IP addresses for the workstation are checked (step 755). After all checks have been performed, the process ends at 790. While described as a sequential process, the processing described above could take place in a different order and some processing can be done at the same time (in parallel with) other processing. The steps shown in FIG. 7 can be performed manually by an operator following an instruction sheet or may be performed automatically by a program designed to perform the above-described checks.

FIG. 8 shows a low-level flowchart for duplicating the collected workstation data onto a different workstation (see predefined process 440 in FIG. 4). First, a removable nonvolatile storage device is installed and/or configured to work with the workstation if such device is not already installed and configured (step 810). The removable nonvolatile computer medium onto which the captured data was saved is loaded in the installed and configured removable nonvolatile storage device in order to copy the previously captured user environment data (step 825). Next, the networking files are restored (step 830). Next, the unique system information that was previously captured is duplicated to the new workstation (step 835). After the unique system information is duplicated, the home/local data is restored (step 840) and any ADSM files are restored (step 845). Next, the application data that was previously identified and captured is duplicated to the new workstation (step 850).

After application data is restored, the tty information that was captured from the old workstation is duplicated to the new workstation (step 855). Then the remote printer definitions that were captured from the old workstation are duplicated to the new workstation (step 860). After the printer definitions are duplicated, the workstation's IP address and workstation name (hostname) are assigned to the permanent hostname and IP address which is provided by the user (step 865). After the hostname and IP address changes have taken place, the Ethernet interfaces are checked and verified (step 870). Next, the file permissions of key files that have been duplicated onto the new workstation are modified to reflect the move from the old workstation to the new workstation (step 875). After the monitor timeout has been disabled (step 880), the license file data is modified (step 885) to reflect the duplication of licensed data, such as software products, from the old workstation to the new workstation. Finally, temporary files are cleaned up (step 890) before the processing ends at 895.

The above-outlined steps are for a UNIX environment. Alternative embodiments may have somewhat different processing steps due to differences in operating systems. In addition, the steps outlined above could be performed in a somewhat different order, however the order outlined above is preferred for a UNIX environment.

FIG. 9 shows a low-level flowchart of details of modifying X-windows settings on the new workstation (see step 450 in FIG. 4). First, a new window is created (step 910). Then the X-windows session is terminated (step 920), followed by setting the landscape (step 930) and portrait (step 940) settings of the new workstation's X-windows. After the settings have been changed, processing of the X-windows settings ends at 990.

Figure 10:
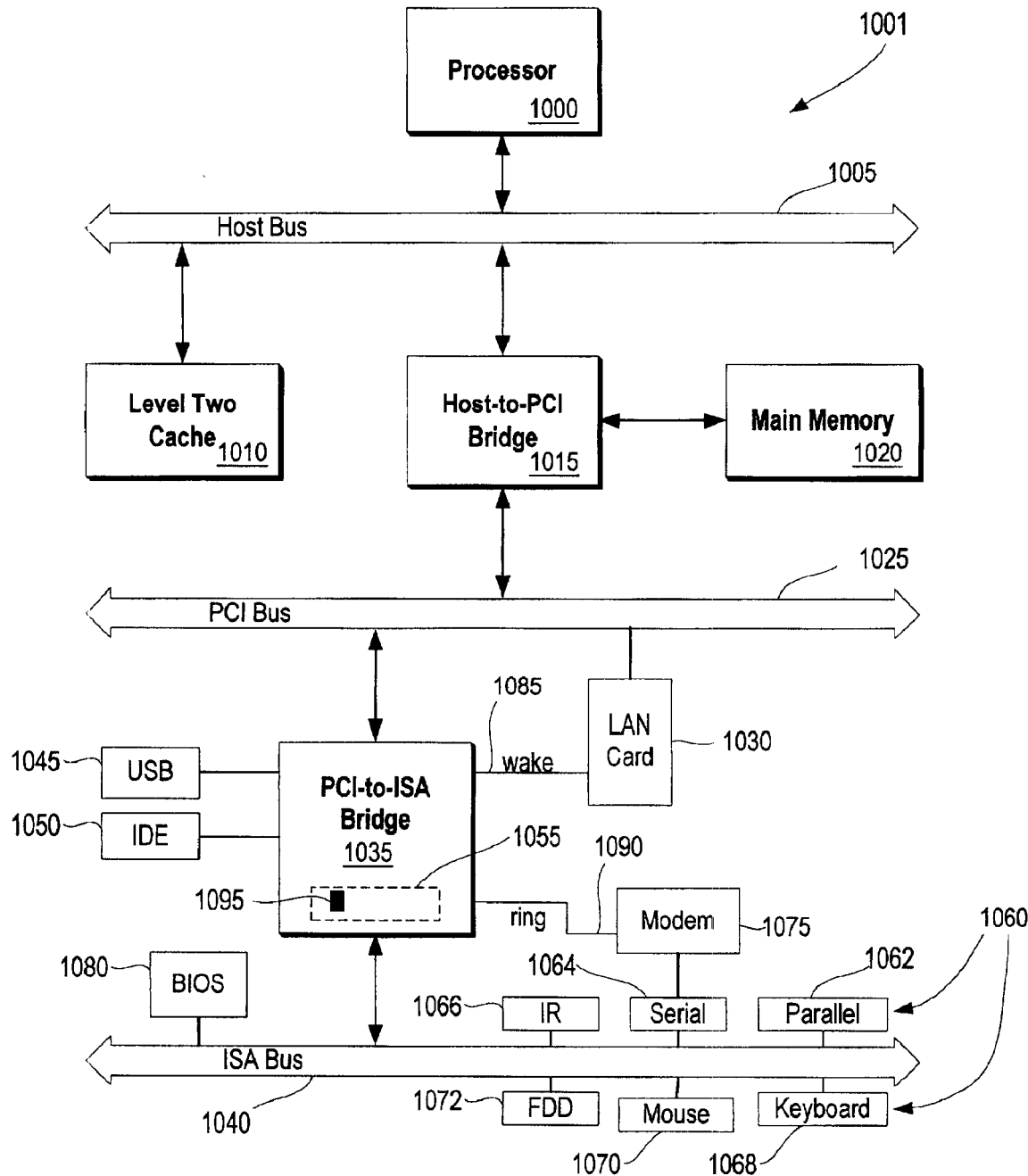
FIG. 10 is a block diagram showing an information handling system.

FIG. 10 illustrates a computer system 1001 which is a simplified example of a computer system capable performing the capturing and duplicating processing described herein. Computer system 1001 includes processor 1000 which is coupled to host bus 1005. A level two (L2) cache memory 1010 is also coupled to the host bus 1005. Host-to-PCI bridge 1015 is coupled to main memory 1020, includes cache memory and main memory control functions, and provides bus control to handle transfers among PCI bus 1025, processor 1000, L2 cache 1010, main memory 1020, and host bus 1005. PCI bus 1025 provides an interface for a variety of devices including, for example, LAN card 1030. PCI-to-ISA bridge 1035 provides bus control to handle transfers between PCI bus 1025 and ISA bus 1040, universal serial bus (USB) functionality 1045, IDE device functionality 1050, power management functionality 1055, and can include other functional elements not shown, such as a real-time clock (RTC), DMA control, interrupt support, and system management bus support. Peripheral devices and input/output (I/O) devices can be attached to various interfaces 1060 (e.g., parallel interface 1062, serial interface 1064, infrared (IR) interface 1066, keyboard interface 1068, mouse interface 1070, and fixed disk (FDD) 1072) coupled to ISA bus 1040. Alternatively, many I/O devices can be accommodated by a super I/O controller (not shown) attached to ISA bus 1040.

The BIOS 1080 is coupled to ISA bus 1040, and incorporates the necessary processor executable code for a variety of low-level system functions and system boot functions. BIOS 1080 can be stored in any computer readable medium, including magnetic storage media, optical storage media, flash memory, random access memory, read only memory, and communications media conveying signals encoding the instructions (e.g., signals from a network). In order to attach computer system 1001 to a NIM server over a local area network, LAN card 1030 is coupled to PCI-to-ISA bridge 1035. Similarly, to connect to a NIM server using a telephone line connection, modem 1075 is connected to serial port 1064 and PCI-to-ISA Bridge 1035

While the computer system described in FIG. 10 is capable of executing the capturing and duplicating processes described herein, this computer system is simply one example of a computer system. Those skilled in the art will appreciate that many other computer system designs are capable of running the UNIX operating system (or any operating system, such as Windows 95/98/NT licensed by Microsoft Corporation or AIX or OS/2 licensed by IBM) and performing the processing described herein.

Figure 11:
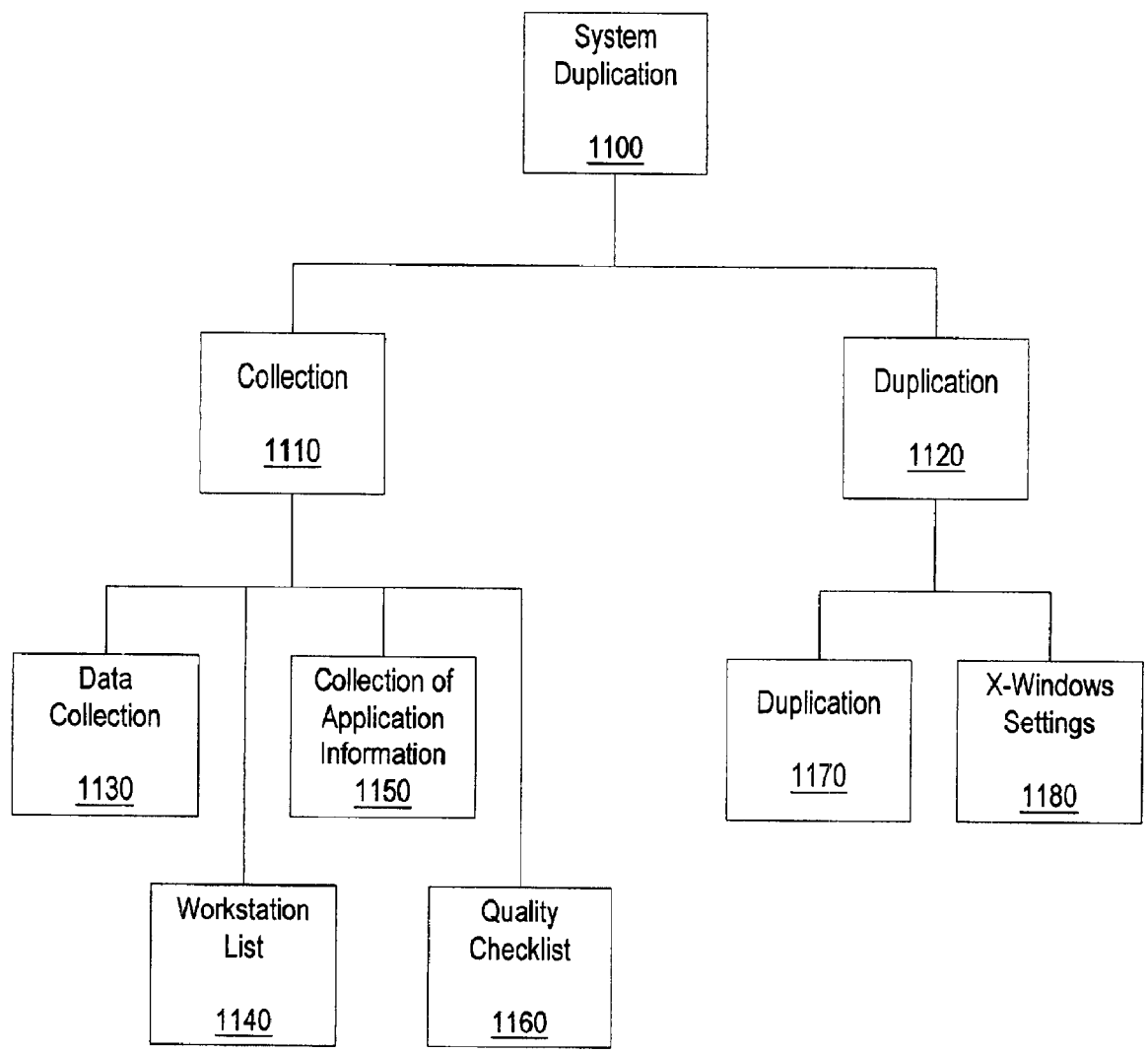
FIG. 11 is a hierarchy chart showing the script files used in one embodiment of the present invention.

FIG. 11 shows a hierarchy chart for processes involved in collecting and duplicating a workstation environment. System duplication 1100 is the highest level in the hierarchy chart. System duplication 1100 breaks down into two general processing categories: collection 1110, which collects the user environment data from the old workstation, and duplication 1120 which duplicates the information collected by collection 1110 onto a new workstation. Collection 1110 breaks down into four processes. Data collection 1130 collects the user environment data from the old workstation (for a flowchart depiction, see FIG. 5). Workstation list 1140 includes a list of workstations that will have user environment data collected and duplicated. Collection of application data 1150 includes processing to collect application data from the workstation (for a flowchart depiction, see FIG. 6). Finally, quality checklist 1160 includes processing to check whether the user environment data has been successfully collected (for a flowchart depiction, see FIG. 7).

On the duplication 1120 side of the hierarchy chart, two processes are shown breaking down from duplication 1120. First, duplication 1170 duplicates the user environment data collected from the old workstation onto the new workstation (for a flowchart depiction, see FIG. 8). Second, X-Windows Settings 1180 sets the X-Windows settings in the new workstation (for a flowchart depiction, see FIG. 9).

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for duplicating a user environment in a first computer system to a second computer system, said method comprising:
   collecting user environment data from the first computer system, the collecting performed by a computer program, and the user environment data including a printer definition, a network interface, a user password, and license information;
   storing the user environment data on a removable nonvolatile media;
   transporting the removable nonvolatile media from the first computer system to the second computer system;
   loading the removable nonvolatile media in a device capable of reading the media; and
   restoring the user environment data from the removable nonvolatile media to the second computer system.

2. The method of claim 1, wherein the collecting includes:
   identifying attributes to include in the user environment data.

3. The method of claim 1, wherein the first computer system includes a UNIX operating system.

4. The method of claim 1, wherein the collecting is performed for a plurality of users, each of the plurality of users having one or more accounts on the first computer system.

5. An information handling system, said system comprising:
   one or more processors;
   an operating system operable by the processors;
   a memory accessible by the processors;
   a removable nonvolatile storage device accessible by the processors;
   a user environment duplication tool for duplicating user environment data in a first computer system to a second computer system, the tool including;
   means for collecting user environment data from the first computer system, the collecting performed by a computer program, and the user environment data including a printer definition, a network interface, a user password, and license information;
   means for storing the user environment data on a removable nonvolatile media;
   means for transporting the removable nonvolatile media from the first computer system to the second computer system;
   means for loading the removable nonvolatile media in a device capable of reading the media; and
   means for restoring the user environment data from the removable nonvolatile media to the second computer system.

6. The information handling system of claim 5, wherein the collecting includes:
   means for identifying attributes to include in the user environment data.

7. The information handling system of claim 5, wherein the first computer system includes a UNIX operating system.

8. The information handling system of claim 5, wherein the means for collecting is performed for a plurality of users, each of the plurality of users having one or more accounts on the first computer system.

9. A computer program product stored on a computer operable medium, the computer program product programmed to duplicate a user environment in a first computer system to a second computer system, said computer program product comprising:

means for collecting user environment data from the first computer system, the collecting performed by a computer program, the user environment data including a printer definition, a network interface, a user password, and license information;

means for storing the user environment data on a removable nonvolatile media;

means for transporting the removable nonvolatile media from the first computer system to the second computer system;

means for loading the removable nonvolatile media in a device capable of reading the media; and means for restoring the user environment data from the removable nonvolatile media to the second computer system.

10. The computer program product of claim 9, wherein the collecting includes:

means for identifying attributes to include in the user environment data.

11. The computer program product of claim 9, wherein the means for collecting is performed for a plurality of users, each of the plurality of users having one or more accounts on the first computer system.

* * * * *